(12) United States Patent
Garimella et al.

(10) Patent No.: US 9,892,726 B1
(45) Date of Patent: Feb. 13, 2018

(54) CLASS-BASED DISCRIMINATIVE TRAINING OF SPEECH MODELS

(71) Applicant: Amazon Technologies, Inc., Seattle, WA (US)

(72) Inventors: Sri Venkata Surya Siva Rama Krishna Garimella, Seattle, WA (US); Spyridon Matsoukas, Hopkinton, MA (US); Ariya Rastrow, Seattle, WA (US); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 465 days.

(21) Appl. No.: 14/574,239

(22) Filed: Dec. 17, 2014

(51) Int. Cl.
| | |
|---|---|
| *G10L 15/00* | (2013.01) |
| *G10L 15/06* | (2013.01) |
| *G10L 15/14* | (2006.01) |
| *G10L 15/08* | (2006.01) |
| *G10L 15/22* | (2006.01) |

(52) U.S. Cl.
CPC ............ *G10L 15/063* (2013.01); *G10L 15/08* (2013.01); *G10L 15/14* (2013.01); *G10L 15/22* (2013.01); *G10L 2015/0631* (2013.01); *G10L 2015/223* (2013.01)

(58) Field of Classification Search
CPC ................................ G10L 17/00; G10L 17/04
USPC ........................................................ 704/240
See application file for complete search history.

(56) References Cited

U.S. PATENT DOCUMENTS

| | | | |
|---|---|---|---|
| 2008/0021897 A1* | 1/2008 | Lepre ................ G06F 17/30598 |
| 2010/0169094 A1* | 7/2010 | Akamine ............. G10L 15/144 704/244 |
| 2010/0198598 A1* | 8/2010 | Herbig .................... G10L 17/06 704/240 |
| 2013/0253931 A1* | 9/2013 | Shen ....................... G10L 17/04 704/245 |
| 2013/0262119 A1* | 10/2013 | Latorre-Martinez ... G10L 13/08 704/260 |
| 2016/0019883 A1* | 1/2016 | Aronowitz ............. G10L 17/04 704/244 |
| 2016/0078771 A1* | 3/2016 | Zhuang .................... G09B 5/00 434/236 |

* cited by examiner

*Primary Examiner* — Paras D Shah
*Assistant Examiner* — Timothy Nguyen
(74) *Attorney, Agent, or Firm* — Knobbe, Martens, Olson & Bear, LLP (57) ABSTRACT

Features are disclosed for modifying a statistical model to more accurately discriminate between classes of input data. A subspace of the total model parameter space can be learned such that individual points in the subspace, corresponding to the various classes, are discriminative with respect to the classes. The subspace can be learned using an iterative process whereby an initial subspace is used to generate data and maximize an objective function. The objective function can correspond to maximizing the posterior probability of the correct class for a given input. The initial subspace, data, and objective function can be used to generate a new subspace that better discriminates between classes. The process may be repeated as desired. A model modified using such a subspace can be used to classify input data.

20 Claims, 5 Drawing Sheets

CLASS-BASED DISCRIMINATIVE TRAINING OF SPEECH MODELS

BACKGROUND

Computing devices can be used to process a user's spoken commands, requests, and other utterances into written transcriptions. Models representing data relationships and patterns, such as functions, algorithms, systems, and the like, may accept audio data input (sometimes referred to as an input vector), and produce output (sometimes referred to as an output vector) that corresponds to the input in some way. In some implementations, a model is used to generate a probability or set of probabilities that the input corresponds to a particular language unit (e.g., phoneme, phoneme portion, triphone, word, n-gram, part of speech, etc.). For example, an automatic speech recognition ("ASR") system may utilize various models, such as an acoustic model and a language model, to recognize speech. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance.

ASR systems commonly utilize Gaussian mixture models ("GMMs") to model acoustic input. Features can be extracted from an utterance in the form of feature vectors, which include one or more numbers that describe the audio input. The feature vectors can be processed using GMMs to determine the most likely word or subword unit that was spoken and that resulted in the corresponding feature vectors extracted. Typically, GMMs are trained, using training data, to maximize the likelihood of the correct words or subword units corresponding to the feature vectors of the training data.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

The present disclosure is directed to modifying statistical models to discriminate between classes of input. In some embodiments, input may be classified as any of a finite set of classes that can be determined from audio data, such as: speech or non-speech; one of multiple (e.g., two or more) different keywords; speech from a male speaker or a female speaker; etc. The input may be classified using models for the individual classes. In order to better discriminate between the classes, the models may be modified based on a selected portion of the model parameters. For example, the models may be trained, adapted, adjusted, etc. using a portion or subset of a total parameter space, such as a low-dimension subspace of the total parameter space (e.g., a subspace with fewer dimensions than the total parameter space). The subspace may be learned specifically to discriminate between the possible classes (e.g., points in the subspace, corresponding to the various classes, are determined such that a model modified with the points is better able to discriminate the various classes).

Generally described, statistical models, such as Gaussian Mixture Models ("GMMs"), may have any number of individual components, such as individual Gaussian distributions (also referred to simply as "Gaussians"). GMMs can accurately model non-normal distributions, such as multi-model distributions, asymmetric distributions, and the like. Illustratively, a GMM may be used to model statistical data computed from audio signals, such as a GMM in which the individual components are Gaussian distributions of statistical features computed from audio signals. The individual Gaussians may be weighted with respect to each other, and may be defined by parameter information regarding the mean and the variance of the Gaussian distribution, such as a mean vector and a covariance matrix. Thus, a GMM may be defined by a set of weights and corresponding parameters for its component Gaussians. One common way, among others, of modifying the Gaussians of a GMM is to adjust their mean vectors. In some cases, modifying a model may be referred to as "adapting" or "adjusting" the model. The mean vectors for all components of the GMM may be concatenated to obtain the total parameter space for the mean vectors of the GMM. A subspace of that total parameter space may then be identified by computing the best possible coordinate within the subspace for each segment of input data being used to train the GMM. The subspace can then be adjusted such that the likelihood of the training data is maximized when the components of the GMM are modified based on the subspace.

By way of example, an illustrative GMM has two Gaussians, each modeling a distribution in 10-dimensional space. The mean vectors for each of the two Gaussians are therefore 10-dimensional vectors (e.g., vectors with 10 separate values corresponding to the means of the 10 dimensions of the distribution). One way to modify the GMM is to determine new mean vectors anywhere within a 20-dimensinal space defined by the combination of the two 10-dimensional mean vectors of the component Gaussians. Another way to modify the GMM is to place a constraint on the total parameter space within which the new mean vectors may be determined (e.g., the 20-dimensional space), thereby using only a subspace of the total parameter space of the GMM (e.g., some lower-dimensional subspace of the 20-dimensional space). The subspace can be selected using points that maximize the likelihood of the training data being used. A subspace matrix defining the subspace may be added to the mean vectors to modify (or "adapt" or "adjust") the GMM. However, models modified using these and other techniques are not able to classify input data because they are not designed to deal with classes, or they are designed with the assumption that all data is properly classified in a single class. Thus, models modified using such existing techniques are not able to adequately discriminate between classes of input data.

Some aspects of the present disclosure relate to learning a subspace of the total parameter space of a model such that when the model is modified using the subspace (e.g., using points within the learned subspace), the probability that the model will correctly classify input data is maximized. In some embodiments, modifying the model may include adding a subspace matrix defining the learned subspace (or adding data derived from the subspace matrix, such as a product of the matrix and a particular data value) to the mean vectors of the model. In contrast to traditional adaptation techniques, which merely aim to maximize the likelihood of training data without respect to class (or which assume all data is properly classified within the same class), embodiments described herein use a generative model and training data to learn a subspace that maximizes the distance, in a statistical sense, between points in the subspace corresponding to data from different classes. Such a subspace can then be used to modify the model to discriminate classes of input data. Illustratively, the training data may include a set of data segments (e.g., each data segment may correspond to an utterance, and may be composed of one or more feature vectors) and correct class labels for the data segments. A discriminative objective function (e.g., a function that corresponds to the objective of the process: to discriminate classes) can use data generated using the generative model, or values derived therefrom, to learn the desired subspace that maximizes the probability of the correct classes for the training data.

Additional aspects of the present disclosure relate to generating data for use in learning the subspace described above and in greater detail below. In some embodiments, data is generated by randomly selecting a class, selecting a Gaussian from an existing GMM that models the selected class, generating a point in an initial guess for the subspace, and then generating values based on the selected Gaussian modified using the initial guess for the subspace and the point generated in the subspace. Such a generative model can be used to optimize the discriminative objective function. The subspace is learned such that modifying the model within the learned subspace improves the probability that the model correctly classifies data.

Further aspects of the present disclosure relate to detei mining the posterior distribution of certain variables in the discriminative objective function such that the subspace can be learned. The discriminative objective function, also referred to simply as the "objective function," may include one or more hidden or latent variables and any number of observed variables. In some embodiments, an auxiliary function with the same gradient (e.g., derivative, or slope and direction of maximum increase in function value) as the objective function may be used in place of the objective function for convenience, such as when performing computations with the auxiliary function is easier or less resource-intensive than performing computations with the objective function. The hidden variables of the objective function (or auxiliary function) may include, among others, the mean of the posterior distribution of the subspace points corresponding to the individual data segments for a given class, the posterior probability of the correct class for a given data segment, and the like. Using the data described above and in greater detail below, such hidden variables can be computed and then used in the objective function (or auxiliary function) to learn the subspace.

Still further aspects of the present disclosure relate to using the class models modified using the learned subspace. In some embodiments, the class models can be used to classify input data into particular classes. For example, a keyword spotting system may use such class models to detect when a particular keyword has been spoken by classifying audio input as including the particular keyword out of multiple possible keywords, as including or excluding the particular keyword, etc. In additional embodiments, the class models may be used to determine the gender of a speaker so that speech recognition models tailored for the speaker's gender can be used. In further embodiments, the class models may be used to determine whether input contains speech of any kind, such that speech recognition systems only proceed to perform speech recognition on input that is classified as human speech (as opposed to non-speech).

Although the examples and embodiments described herein will focus, for the purpose of illustration, on particular methods of generating data, maximizing values, and learning a discriminative subspace, one skilled in the art will appreciate that the techniques described herein are illustrative only, and are not intended to be exhaustive or limiting. For example, other techniques of generating data and maximizing probabilities may be used. Various aspects of the disclosure will now be described with regard to certain examples and embodiments, which are intended to illustrate but not limit the disclosure.

Example Process for Learning a Discriminative Subspace

Figure 1:
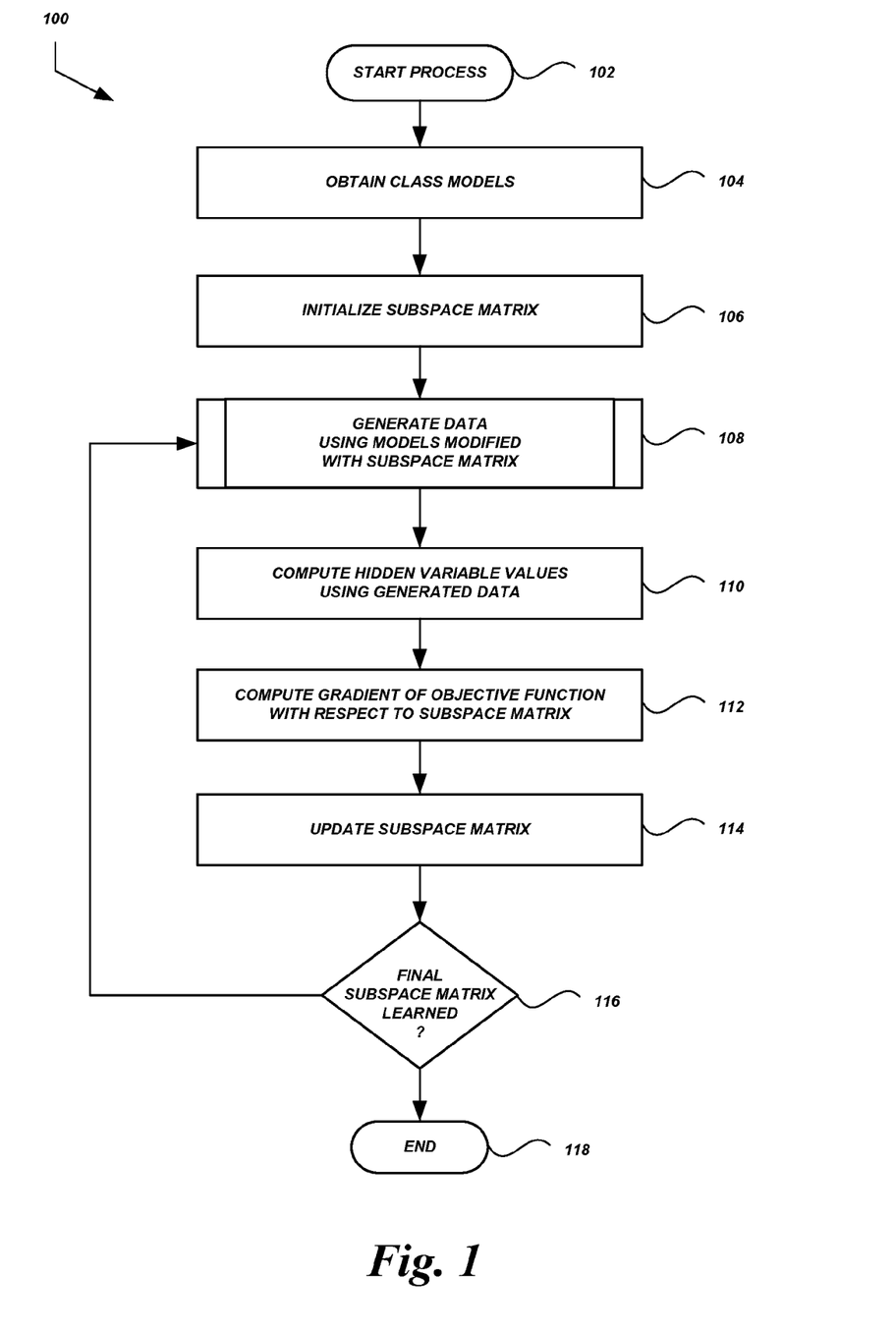
FIG. 1 is a flow diagram of an illustrative process for learning a discriminative model parameter subspace according to some embodiments.

FIG. 1 depicts an illustrative process 100 for learning a discriminative subspace that can be used to modify class models for improved class discrimination. Advantageously, the process 100 may be used to learn the subspace such that when a model is modified using points in that subspace, the probability of correct classification using the model is maximized or otherwise improved.

The process 100 begins at block 102. The process 100 may be embodied in a set of executable program instructions stored on a computer-readable medium, such as one or more disk drives, of a computing system, such as the model training system 202 shown in FIG. 2 and described in greater detail below. When the process 100 is initiated, the executable program instructions can be loaded into memory, such as RAM, and executed by one or more processors of the computing system.

At block 104, the system executing the process 100 can obtain models for the various classes of input data to be classified. Illustratively, the models may be previously-generated or previously-trained GMMs that include any number of individual Gaussians. For example, the GMM for a given class may have been generated using training data for the class, and the GMM may have been trained to maximize the likelihood of the training data for the class.

At block 106, the system executing the process 100 can determine an initial subspace $T_0$ of the overall parameter space for the GMMs to use as a starting point in the subspace learning process. The initial subspace may be a subspace matrix $T_0$ that is randomly initialized. In some embodiments, the subspace matrix $T_0$ may be intelligently initialized. For example, techniques such as principal component analysis ("PCA") may be used to initialize the subspace by applying a statistical transformation to values from the total parameter space.

The process of learning a better (e.g., more discriminative) subspace matrix $T_{final}$ to use in modifying the class GMMs may be based on an objective function (e.g., a function that corresponds to the objective of the process: to accurately discriminate classes). For example, the gradient of the objective function may be computed with respect to the initial guess $T_0$ for the subspace matrix, and the process may be repeated to adjust the subspace matrix as described in greater detail below. In some embodiments, the objective function may be given by equation [1], below:

$$\operatorname*{argmax}_{\Theta} \sum_{s=1}^{N} \log P_{\Theta}(C_s = y_s | X_s) \equiv \qquad [1]$$

$$\operatorname*{argmax}_{\Theta} \sum_{s=1}^{N} [\log P_{\Theta}(X_s, C_s = y_s) - \log P_{\Theta}(X_s)]$$

where $C_s$ is a random variable representing the class of the $s^{th}$ data segment determined using the model, $y_s$ is the true class label of the $s^{th}$ data segment, $X_s$ is the set of feature vectors for the $s^{th}$ segment, and $\Theta$ is the set of known parameters for the class GMM (weights, mean vectors and covariance matrices for the component Gaussians) and also the subspace matrix T currently being used (initially, $T_0$). As seen, the sample objective function may be constructed as the difference of two terms: the first term corresponds to the log probability of observing feature vectors for the data segment and also determining the correct class for that data segment using the model with parameters $\Theta$, and the second term corresponds to the log probability of observing the feature vectors for the data segment using the model with parameters $\Theta$.

The gradient of the objective function may be computed with respect to the initialized subspace matrix in order to learn a better (e.g., more discriminative) subspace matrix. However, computing the gradient of equation [1] or some similar objective function can be difficult. Therefore, an auxiliary function (a function that can be shown to have the same gradient) may be used instead. For example, the weak sense auxiliary function of the objective function in equation [1] may be constructed as the difference between the auxiliary functions of the individual terms in equation [1], as shown in equation [2], below:

$$Q(\Theta^0, \Theta) \approx \sum_{s=1}^{N} \left[ \left(1 - P_{\Theta^0}(C_s = y_s | X_s)\right) \left(E_{q_s|X_s,Z_s^{y_s},C_s=y_s}^{\Theta^0} [\log P_{\Theta}(X_s, Z_s^{y_s}, C_s = y_s, q_s)] - E_{q_s|X_s,Z_s^{1-y_s},C_s=1-y_s}^{\Theta^0} [\log P_{\Theta}(X_s, Z_s^{1-y_s}, C_s = 1 - y_s, q_s)] \right) \right] \qquad [2]$$

where $q_s$ is the subspace point for the $s^{th}$ data segment generated according to a distribution having a zero mean and a unit variance, and $Z_s$ identifies the Gaussian components from which the feature vectors $X_s$ were generated for the $s^{th}$ data segment. The initial subspace $T_0$ may be part of the initial model parameters $\Theta_0$ shown in equation [2]. In order to properly compute the gradient of the auxiliary function, one or more hidden variables (e.g., variables which cannot be directly observed from the data) may be computed. For example, the posterior distribution of the subspace points $q_s$ may be computed, the posterior probability of the correct class $y_s$ for a given data segment s may be computed, etc. using data generated below.

Figure 3:
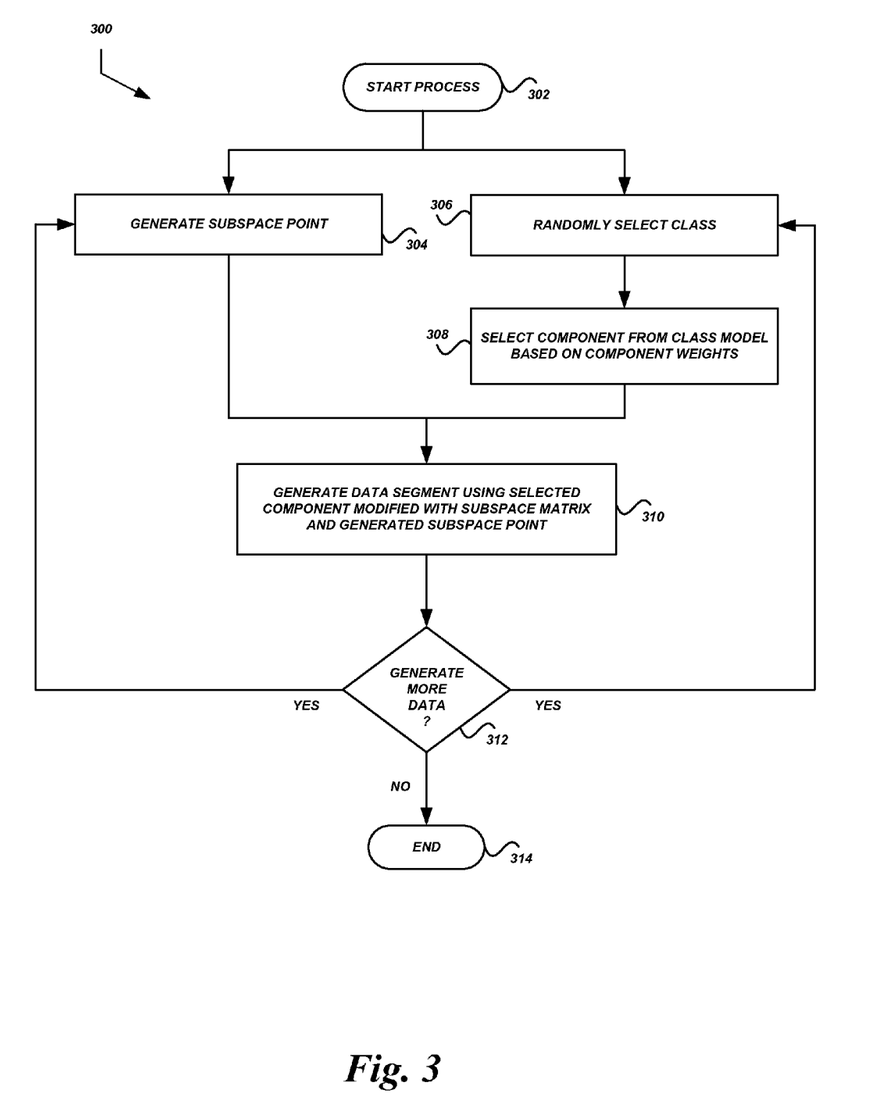
FIG. 3 is a flow diagram of an illustrative process for generating data for use in learning a discriminative model parameter subspace according to some embodiments.

At block 108, the system executing the process 100 can generate data using the class models modified with the current subspace matrix T. FIG. 3, described in greater detail below, illustrates an example process for generating data using the class models modified with the subspace matrix. Such a generative model can be used for computing the hidden variables. In some embodiments, block 108 may be omitted or replaced with an alternative method of obtaining data from which to compute the hidden variables described below.

At block 110, the system executing the process 100 can use the data generated above to, among other things, compute the hidden variables of the auxiliary function. For example, the specific Gaussian component $Z_s$ used to generate the feature vectors $X_s$ for the $s^{th}$ segment, the subspace point $q_s$ randomly generated and used to modify the Gaussian component $Z_s$, and the correct class $y_s$ for the $s^{th}$ segment may be used to compute the mean posterior distribution of subspace points, the posterior probability of the correct class, etc.

Equation [3] below gives the mean of the posterior distribution of the subspace points q for a given class j:

$$f_{\Theta}(q_s|X_s, Z_s^j, C_s = j) \sim N(\cdot; \mu_{q_s}^j, \Sigma_{q_s}^j) \qquad [3]$$

where $\mu_{q_s}^j$ corresponds to the mean of the distribution, and $\Sigma_{q_s}^j$ corresponds to the covariance matrix of the distribution. Equation [4] below gives the posterior probability of the correct class for a given data segment $X_s$:

$$P_{\Theta}(C_s = j | X_s) \approx \frac{\eta(j)}{\sum_{j=0}^{1} \eta(j)} \qquad [4]$$

In some embodiments, additional or alternative hidden variables may be computed, or alternative equations or methods may be used to compute the hidden variables describe above.

At block 112, the system executing the process 100 can compute the gradient of the objective function (or auxiliary function) with respect to the current subspace matrix T. Illustratively, if the subspace matrix T has not yet been modified or updated, then the gradient of the auxiliary function may be computed with respect to $T_0$. If the subspace has been updated or modified to subspace is $T_1$ then the gradient of the auxiliary function may be computed with respect to $T_1$, and so on.

At block 114, the system executing the process 100 can update the subspace matrix using the gradient computed above to generate $T_1$ (when the gradient above is computed with respect to $T_0$), $T_2$ (when the gradient above is computed with respect to $T_1$), and so on. One method for updating a subspace matrix $T_i$ for a given class j is given by equation [5], below:

$$T_{i,j} = \left( \sum_{s=1,s:y_s=j}^{N} \left[ (1 - P_{\Theta^0}(C_s = j | X_s)) f_{s,i}^j E_{q_s|X_s,Z_s^j,C_s=j}^{\Theta^0} [q_s^T] \right] - \sum_{s=1,s:y_s=1-j}^{N} \left[ (1 - P_{\Theta^0}(C_s = 1 - j | X_s)) f_{s,i}^j E_{q_s|X_s,Z_s^j,C_s=j}^{\Theta^0} [q_s^T] \right] \right) \left( \sum_{s=1,s:y_s=j}^{N} \left[ (1 - P_{\Theta^0}(C_s = j | X_s)) \gamma_{s,i}^j E_{q_s|X_s,Z_s^j,C_s=j}^{\Theta^0} [q_s q_s^T] \right] - \sum_{s=1,s:y_s=1-j}^{N} \left[ (1 - P_{\Theta^0}(C_s = 1 - j | X_s)) \gamma_{s,i}^j E_{q_s|X_s,Z_s^j,C_s=j}^{\Theta^0} [q_s q_s^T] \right] \right)^{-1} \qquad [5]$$

In some embodiments, an alternative equation or method may be used to update the subspace matrix. In further embodiments, an additional equation or method may be used to determine the updated subspace matrix, such as using a smoothing function.

At decision block 116, the system executing the process 100 can determine whether to return to block 108 (or, in some embodiments, to block 110) to iteratively learn the final subspace matrix to be used. If the final subspace matrix $T_{final}$ has been learned, the process 100 may terminate at block 118. In some embodiments, the system executing the process 100 can deteiinine that the final subspace matrix $T_{final}$ has been learned when objective function calculations are converging (e.g., the output from the objective function is no longer changing, or is changing by less than a threshold amount, from iteration-to-iteration of the process 100). In some embodiments, the subspace matrix can be used on training data, and accuracy can be compared from iteration-to-iteration. When the accuracy reaches a desired level, no longer improves, improves by less than a threshold amount, begins to degrade, etc., then $T_{final}$ can be determined (e.g., the last version of the matrix used before accuracy began to degrade can be identified as $T_{final}$).

Example Statistical Modeling Environment

Figure 2:
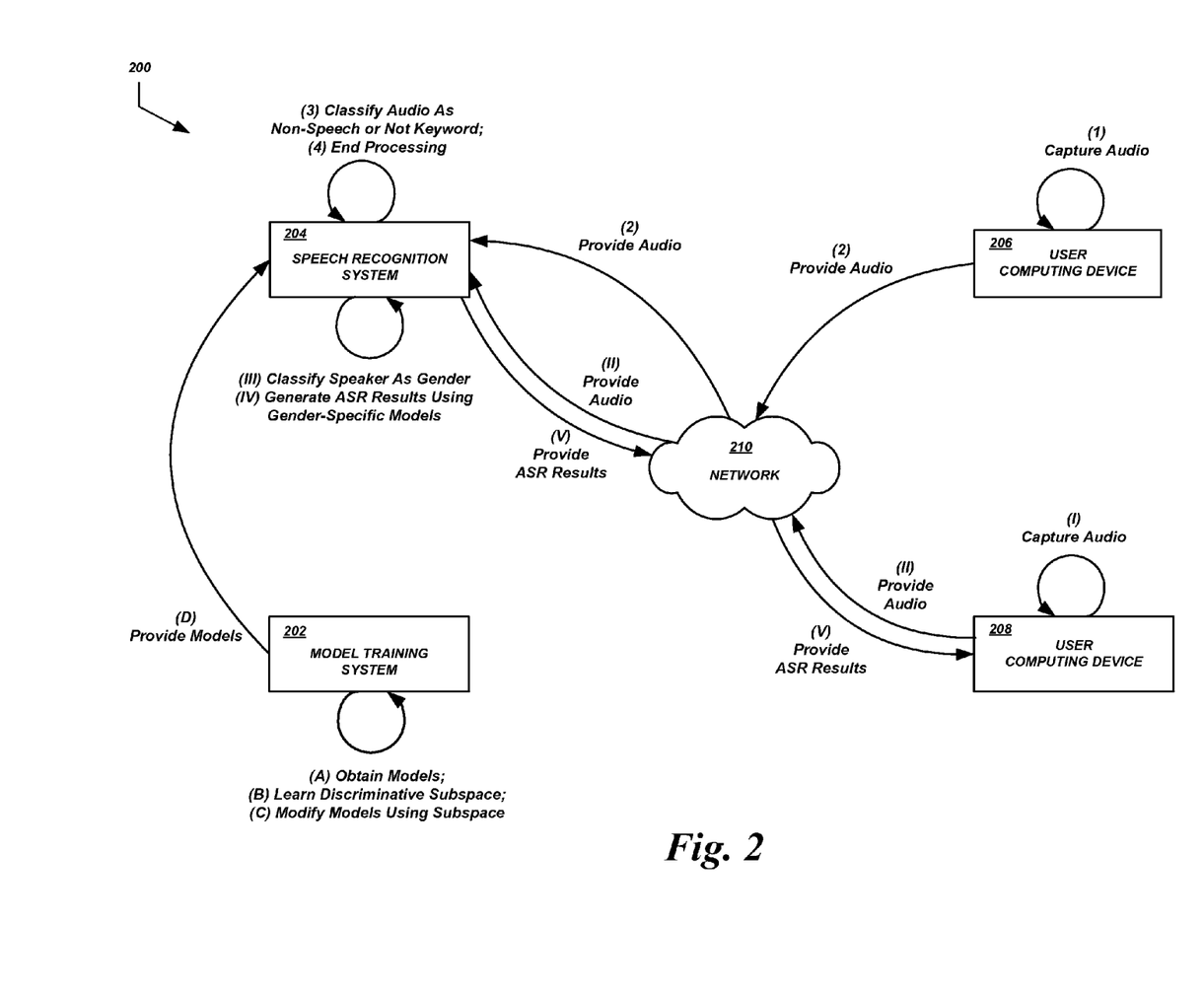
FIG. 2 is a block diagram of an illustrative statistical modeling environment including a model training server, a speech recognition server, and various user computing devices according to some embodiments.

FIG. 2 illustrates an example statistical modeling environment 200 including a model training system 202, a speech recognition system 204, a various client devices 206, 208 in communication via a communication network 210. The model training system 202 may train models to discriminate between classes of input data, as described above. The trained models may then be used by the speech recognition system 204 to classify or otherwise process audio input obtained from user devices 206 and 208. For example, a user can issue spoken commands to a user device 206 in order to get directions, listen to music, query a data source, dictate a document or message, or the like, and the audio input may be processed by the speech recognition, using models trained by the model training system 202, to classify the audio input or some portion thereof.

The user devices 206 and 208 can correspond to a wide variety of electronic devices. In some embodiments, a user device 206 or 208 may be a computing device that includes one or more processors and a memory which may contain software applications executed by the processors. The user device 206 or 208 may include a microphone or other audio input component for accepting speech input on which to perform speech recognition. The software of the user device 206 or 208 may include components for establishing communications over wireless communication networks or directly with other computing devices. Illustratively, the user device 206 or 208 may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

Figure 5:
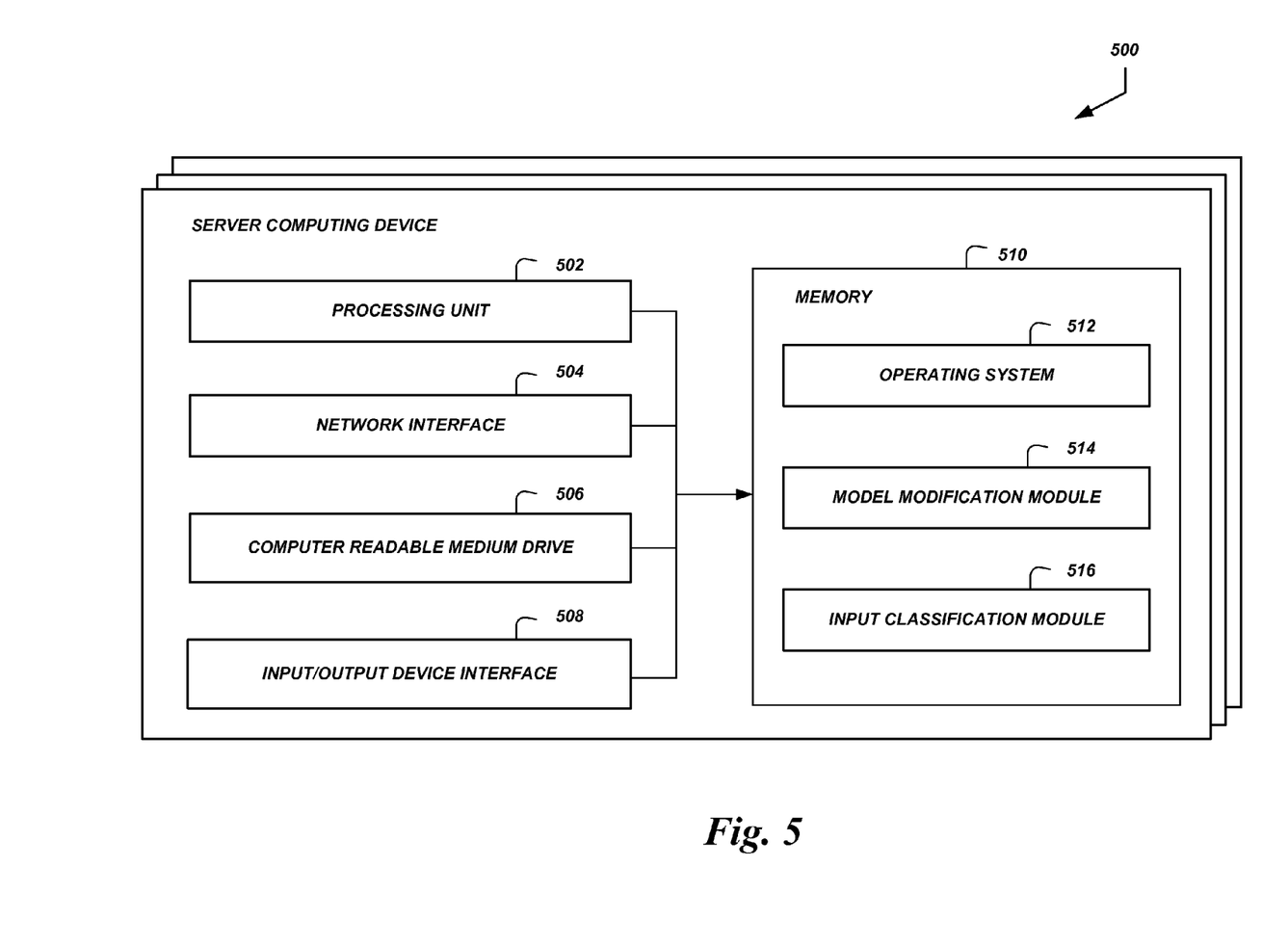
FIG. 5 is a block diagram of an illustrative computing system configured to modify and use models according to some embodiments.

The model training system 202 can be any computing system that is configured to train or modify models using a learned discriminative subspace matrix. For example, the model training system 202 may include server computing devices, desktop computing devices, mainframe computers, other computing devices, some combination thereof, etc. In some embodiments, the model training system 202 can include several devices physically or logically grouped together, such as an application server and a database server. The application server may execute the process 100 described above, the process 300 described below, or other additional or alternative processes to train or modify models using a learned discriminative subspace matrix. The database server may store existing models for use by the application server, trained or modified models generated by the application server, or the like. Illustratively, the model training system 202 may be implemented on one or more of the server computing devices 500 as shown in FIG. 5 and described in greater detail below.

The speech recognition system 204 can be any computing system that is configured to perform speech recognition or classification on audio input. For example, the speech recognition system 204 may include server computing devices, desktop computing devices, mainframe computers, other computing devices, some combination thereof, etc. In some embodiments, the speech recognition system 204 can include several devices physically or logically grouped together, such as an application server and a database server. The speech recognition system 204 can include an automatic speech recognition ("ASR") module or system, a natural language understanding ("NLU") module or system, one or more applications, other modules or systems, some combination thereof, etc. Illustratively, the speech recognition system 204 may be implemented on one or more of the server computing devices 500 as shown in FIG. 5 and described in greater detail below.

In some embodiments, the speech recognition system 204 (or certain modules or components thereof) may be physically or logically associated with the model training system 202 (or certain modules or components thereof) such that they speech recognition system 204 and model training system 202 are not separate systems, but rather parts of a single integrated system. Illustratively, such an integrated system may be implemented on one or more of the server computing devices 500 as shown in FIG. 5 and described in greater detail below. In some embodiments, the features and services provided by the speech recognition system 204 and/or model training system 202 may be implemented as web services consumable via the communication network 210. In further embodiments, the speech recognition system 204 and/or model training system 202 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the speech recognition system 204 (or certain modules or components thereof) may be physically located on a user device 206, 208. For example, a user device 206 may include an integrated ASR module or system such that no network access is required in order to use some or all of its features. In such implementations, the models trained or generated by the model training system 202 may be provided to or otherwise received by the user device 206 for use in speech recognition, input classification, etc. As another example, a portion of ASR processing or other speech recognition system 204 functionality may implemented on a user device 206 or 208, and other speech recognition system 204 components and features may be accessible via a communication network 210.

The network 210 may be a publicly accessible network of linked networks, possibly operated by various distinct parties, such as the Internet. In other embodiments, the network 504 may include a private network, personal area network ("PAN"), location are network ("LAN"), wide area network ("WAN"), cable network, satellite network, etc. or some combination thereof, each with access to and/or from the Internet. For example, the devices of the speech recognition system 204 and/or the model training system 202 may be located within a single data center, and may communicate via a private network as described above. The user devices 206, 208 may communicate with speech recognition system 204 and/or the model training system 202 via the Internet. The user devices 206, 208 may have access to the Internet via a wired or WiFi connection, or via a cellular telephone network (e.g., a Long Term Evolution or LTE network).

Example Process for Generating Data

As shown in FIG. 2, the model training system 202 may obtain existing models at (A) and learn a discriminative subspace at (B). Illustratively, the model training system 202 may use the process 100 described above to learn a discriminative subspace for the models. In doing so, the model training system 202 may generate data to use during the process, as described above with respect to FIG. 1. One method of generating such data is shown in FIG. 3. Advantageously, the model training system 202 may use the process 300 shown in FIG. 3 to generate data using points within the current subspace so that the discriminative effect of the current subspace can be evaluated and/or improved.

The process 300 begins at block 302. The process 300 may be embodied in a set of executable program instructions stored on a computer-readable medium, such as one or more disk drives, of a computing system, such as the model training system 202. When the process 300 is initiated, the executable program instructions can be loaded into memory, such as RAM, and executed by one or more processors of the computing system. For example, the process may be part of the process 100 described above (e.g., block 108), or it may be a separate process that is invoked by the process 100.

At block 304, the system executing the process 300 can generate a point q within the current subspace (e.g., $T_0$, $T_1$, etc.). The point may be generated randomly according to a predetermined or dynamically determined distribution. In some embodiments, the point may be randomly generated from a Gaussian distribution having a zero mean and a unit variance such that over a statistically significant number of iterations, the distribution of generated subspace points corresponds to a simple Gaussian distribution.

At block 306, the system executing the process 300 can select a class j and access the model (e.g., the GMM) for the class. The class may be randomly selected. In some embodiments, the class may be randomly selected according to a prior probability distribution such that classes with higher prior probabilities have a greater chance of being selected.

At block 308, the system executing the process 300 can select a component z from the class model (e.g., a particular Gaussian from the GMM) for the selected class. The component may be selected based on the component weights w such that components with a higher weight have a greater chance of being selected.

At block 310, the system executing the process 300 can generate a data segment using the selected component modified using the current subspace matrix and generated subspace point. As described above, a data segment may include one or more feature vectors. The data segment may be generated by randomly generating values for the feature vectors according to the selected Gaussian component, modified using the subspace matrix and the subspace point, such that over a statistically significant number of iterations, the distribution of feature vector values corresponds to the selected Gaussian modified using the subspace matrix and the subspace point.

At block 312, the system executing the process 300 can determine whether to generate additional data. If so, the process 300 can return to blocks 304 and 306. Otherwise, the process 300 can terminate at block 314. The amount of data that the system generates using the process 300 may be application-specific. In some embodiments, a single data segment or a small number of data segments may be generated and used for an iteration of the process 100. In other embodiments, a larger number of data segments may be generated for use during each iteration of the process 100, or some subset thereof Returning to FIG. 2, the model training system 202 may determine the final subspace and subspace points with which to modify the model at (C), as described above, and may provide the models to the speech recognition system 204 or some other system or device at (D).

Example Process for Using Modified Models

As shown in FIG. 2, the speech recognition system 204 may use the class models provided by the model training system 202 to classify audio received from user computing devices 206, 208. For example, user computing device 206 may capture audio at (1), and the audio may be provided to the speech recognition system 204 at (2). The speech recognition system 204 may then classify the audio at (3) as non-speech, or as failing to include a keyword that indicates that the user is addressing the device and the subsequent speech is to be processed. In response to such determinations, the speech recognition system 204 may end processing at (4). One example process for making such classifications is shown in FIG. 4.

Figure 4:
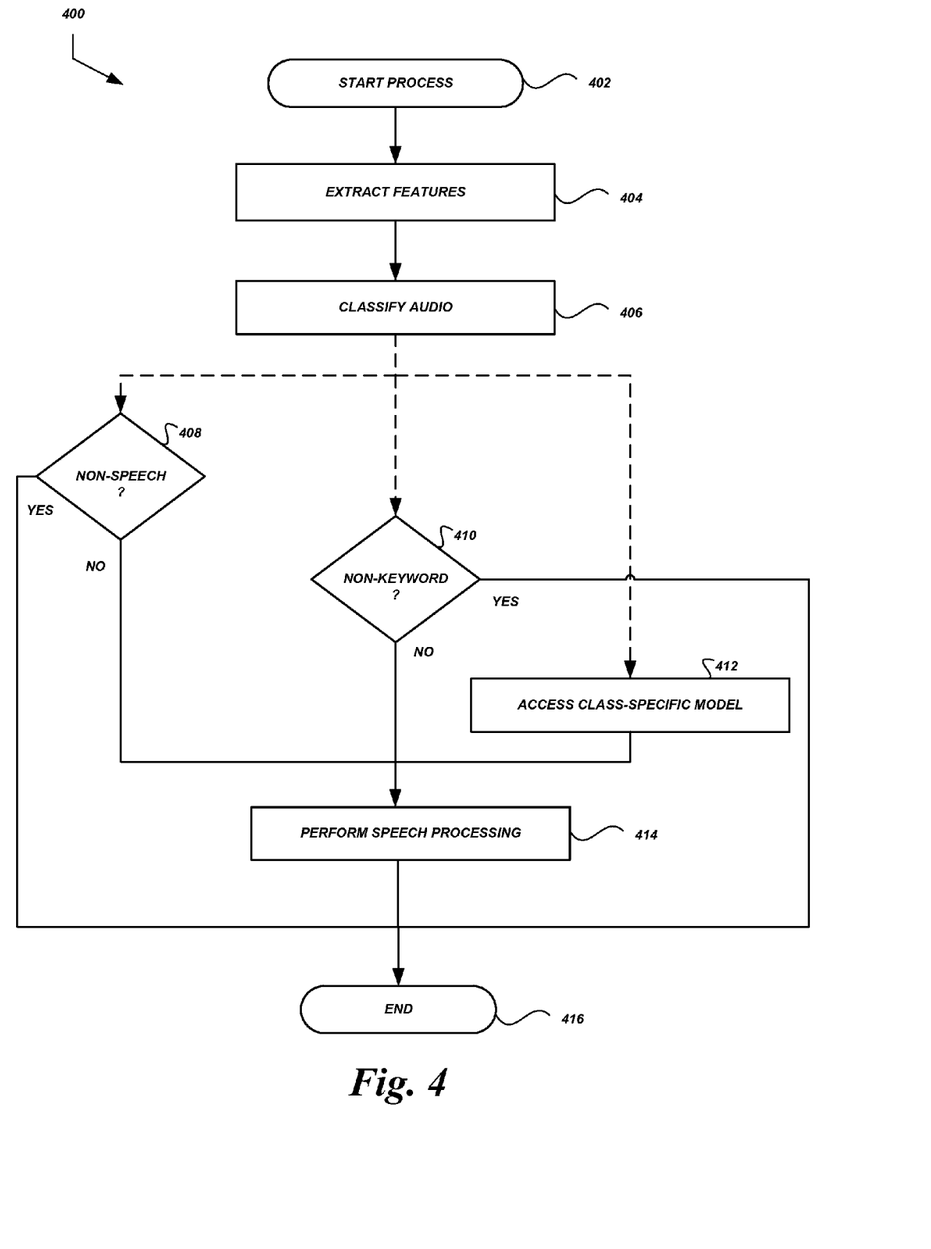
FIG. 4 is a flow diagram of an illustrative process for using a model modified with a discriminative model parameter subspace according to some embodiments.

The process 400 shown in FIG. 4 begins at block 402. The process 400 may be embodied in a set of executable program instructions stored on a computer-readable medium, such as one or more disk drives, of a computing system, such as the speech recognition system 204. When the process 400 is initiated, the executable program instructions can be loaded into memory, such as RAM, and executed by one or more processors of the computing system. For example, the process 400 may be executed in response to the receipt of audio from a user computing device or some other source.

At block 404, the system executing the process 400 can extract features from the audio, as is known to those of skill the art.

At block 406, the system executing the process 400 can process the features, extracted as feature vectors from the audio, using the discriminative models provided by the model training system 202. In some embodiments, the system may use equation [4], or some variant thereof, to determine the most probable true class for the feature vectors extracted from the audio input. For example, the probability that audio input (from which feature vectors X. are extracted for each segment s of audio input) is of a particular class (j) can be computed using equation [4]. In this example, the GMM parameters ($\Theta$) for each class (j) can include weights, mean vectors, covariance matrices, and learned subspace matrices (T) for each of the individual component Gaussians of the GMM, or for some subset thereof.

At decision block 408, the system executing the process 400 can determine if the class identified above is "non-speech." If so, the process 400 may terminate at block 416.

Otherwise, the process may proceed to block 414, where speech recognition is performed.

Alternatively or in addition, the system executing the process 400 can determine at decision block 410 whether the class identified above is "non-keyword." If so (e.g., the audio may have included speech, but nevertheless failed to include a keyword that triggers speech processing), the process 400 may terminate at block 416. Otherwise, the process 400 may proceed to block 414, where speech recognition is performed.

As another example, user computing device 208 may capture audio at (I), and the audio may be provided to the speech recognition system 204 at (II). The speech recognition system 204 may then classify, at (III), the speaker of speech detected in the audio as a member of a particular class (e.g., speaker of a specific gender, speaker of a specific language, etc.). In response to such a classification, the speech recognition system 204 may process the speech using class-specific models at (IV) that provide greater accuracy than general models, and speech recognition results may be returned to the user device 208 at (IV). One example process for making such classifications is shown in FIG. 4.

At block 404, the system executing the process 400 can extract features from the audio, as is known to those of skill the art.

At block 406, the system executing the process 400 can process the features, extracted as feature vectors from the audio, using the discriminative models provided by the model training system 202. Illustratively, the model may use equation [4], or some variant thereof, to determine the most probable true class for the feature vectors extracted from the audio.

At block 412, the system executing the process 400 can access one or more class-specific models for performing speech recognition on the audio. For example, if the audio is classified as including speech from a male speaker, then male-specific models may be accessed. The process may then proceed to block 414, where speech recognition is performed using the class-specific models.

Execution Environment

FIG. 5 illustrates an example server computing device computing device 500 configured to execute the processes and implement the features described above. The computing device 500 can be a server or other computing device, and can comprise a processing unit 502, a network interface 504, a computer readable medium drive 506, an input/output device interface 508, and a memory 510. The network interface 504 can provide connectivity to one or more networks or computing systems. The processing unit 504 can receive information and instructions from other computing systems or services via the network interface 504. The network interface 504 can also store data directly to memory 510. The processing unit 502 can communicate to and from memory 510, execute instructions and process data in memory 510, etc.

The memory 510 may include computer program instructions that the processing unit 502 executes in order to implement one or more embodiments. The memory 510 generally includes volatile memory, such as RAM, and/or other non-transitory computer-readable media. The memory 510 can store an operating system 512 that provides computer program instructions for use by the processing unit 502 in the general administration and operation of the computing device 500. The memory 510 can further include computer program instructions and other information for implementing aspects of the present disclosure. For example, in one embodiment, the memory 510 includes a model modification module 514 that determines subspace matrices to be used in modifying class models, as described above with respect to process 200. Memory 510 may also include an input classification module 516 that uses modified models to classify input, as described above with respect to process 400.

In some embodiments, the computing device 502 may include additional or fewer components than are shown in FIG. 5. For example, a computing device 502 may include more than one processing unit 502 and computer readable medium drive 506. In some embodiments, multiple (e.g., two or more) computing devices 500 may together form a computer system for executing features of the present disclosure. For example, multiple computing devices 500 may communicate with each other via their respective network interfaces 504, and can implement load balancing of multiple tasks (e.g., each computing device 500 may execute one or more separate instances of the processes 200 and/or 400), parallel processing (e.g., each computing device 500 may execute a portion of a single instance of a process 200 and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in teiiiis of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that perfoiins logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more physical computer processors in communication with the computer-readable memory, wherein the one or more physical computer processors are programmed by the executable instructions to at least:
obtain a Gaussian mixture model comprising a plurality of statistical value distributions, wherein individual values of the plurality of statistical value distributions are associated with features of audio signals, and wherein the Gaussian mixture model has a probability of correctly classifying audio signals as comprising speech sounds;
determine a total parameter space for the Gaussian mixture model, wherein the Gaussian mixture model comprises a first mean vector and a covariance matrix, and wherein the first mean vector of the Gaussian mixture model is to be modified within the total parameter space;
generate values in a first subspace matrix, the first subspace matrix corresponding to a portion of the total parameter space;
generate a second subspace matrix based at least partly on the first subspace matrix, a distribution of points generated within the first subspace matrix, and a probability of correctly classifying training data as comprising speech sounds;
add the first mean vector of the Gaussian mixture model to the second subspace matrix to generate a second mean vector, wherein the probability of correctly classifying audio signals as comprising speech sounds using the Gaussian mixture model with the second mean vector and the covariance matrix is increased; and
classify an audio signal as comprising a speech sound using the Gaussian mixture model with the second mean vector.

2. The system of claim 1, wherein the instructions that program the one or more physical computer processors to generate the values in the first subspace matrix further comprise instructions to use principal component analysis to apply a statistical transformation to values from the total parameter space.

3. The system of claim 1, wherein the instructions that program the one or more physical computer processors to generate the second subspace matrix further comprise instructions to generate the second subspace matrix by computing a gradient of an objective function with respect to the first subspace matrix, wherein the objective function comprises a function for maximizing the probability of correctly classifying audio signals as comprising speech sounds.

4. The system of claim 1, wherein the instructions that program the one or more physical computer processors to generate the second subspace matrix further comprise instructions to generate data distributed according to a first statistical value distribution of the plurality of statistical value distributions of the Gaussian mixture model using the second mean vector and the covariance matrix.

5. A computer-implemented method comprising:
under control of one or more computing devices configured with specific computer-executable instructions,
obtaining a Gaussian mixture model having a first probability of correctly classifying audio signals in a first class of a plurality of classes, wherein at least a portion of parameters of the Gaussian mixture model are represented by a mean vector, and wherein the first class is associated with a speech sound;
generating a modified subspace matrix, corresponding to a subspace of a total parameter space of the Gaussian mixture model, based at least partly on an initial subspace matrix and a distribution of points within the initial subspace matrix;
adding the mean vector to the modified subspace matrix to generate a second mean vector, wherein a second probability of correctly classifying audio signals in the first class using the Gaussian mixture model with the second mean vector is higher than the first probability; and
classifying an audio signal in the first class using the Gaussian mixture model with the second mean vector.

6. The computer-implemented method of claim 5, wherein classifying the audio signal in the first class comprises classifying the audio signal as comprising data representing at least one of: a an utterance by a male; an utterance by a female; an utterance comprising a keyword; or an utterance.

7. The computer-implemented method of claim 5, further comprising:
obtaining a second Gaussian mixture model used to classify audio signals in a second class of the plurality of classes;
generating a second modified subspace matrix, corresponding to a subspace of a total parameter space of the second Gaussian mixture model, based at least partly on a second initial subspace matrix and a distribution of points within the second initial subspace matrix; and
modifying a parameter of the second Gaussian mixture model in a mean vector of the second Gaussian mixture model using the second modified subspace matrix.

8. The computer-implemented method of claim 5, further comprising initializing the initial subspace matrix by applying a statistical transformation to values from a total parameter space.

9. The computer-implemented method of claim 5, wherein generating the modified subspace matrix comprises computing a gradient of an objective function with respect to the initial subspace matrix, wherein the objective function comprises a function for maximizing a probability of correctly classifying audio signals in the first class.

10. The computer-implemented method of claim 5, wherein generating the modified subspace matrix comprises maximizing a probability of correctly classifying training data segments.

11. The computer-implemented method of claim 5, further comprising computing a product using the modified subspace matrix, wherein modifying the parameter comprises adding the product to the mean vector.

12. The computer-implemented method of claim 5, further comprising:
obtaining a set of audio signal data segments with corresponding class labels;
generating a first set of test class labels using the set of audio signal data segments and the Gaussian mixture model with the mean vector;
determining the first probability using the first set of test class labels and the corresponding class labels;
generating a second set of test class labels using the set of audio signal data segments and the Gaussian mixture model with the second mean vector; and
determining the second probability using the second set of test class labels and the corresponding class labels.

13. One or more non-transitory computer readable media comprising executable code that, when executed, cause one or more computing devices to perform a process comprising:
obtaining a Gaussian mixture model having a first probability of correctly classifying audio signals in a first class of a plurality of classes, wherein at least a portion of parameters of the Gaussian mixture model are represented by a mean vector, and wherein the first class is associated with a speech sound;
generating a modified subspace matrix, corresponding to a subspace of a total parameter space of the Gaussian mixture model, based at least partly on an initial subspace matrix and a distribution of points within the initial subspace matrix;
adding the mean vector to the modified subspace matrix to generate a second mean vector, wherein a second probability of correctly classifying audio signals in the first class using the Gaussian mixture model with the second mean vector is higher than the first probability; and
classifying an audio signal in the first class using the Gaussian mixture model with the second mean vector.

14. The one or more non-transitory computer readable media of claim 13, wherein the total parameter space comprises the total mean vector parameter space for the Gaussian mixture model.

15. The one or more non-transitory computer readable media of claim 13, the process further comprising:
obtaining a second Gaussian mixture model used to classify audio signals in a second class of the plurality of classes;
generating a second modified subspace matrix, corresponding to a subspace of a total parameter space of the second Gaussian mixture model, based at least partly on a second initial subspace matrix and a distribution of points within the second initial subspace matrix; and
modifying a parameter of the second Gaussian mixture model in a mean vector of the second Gaussian mixture model using the second modified subspace matrix.

16. The one or more non-transitory computer readable media of claim 13, the process further comprising initializing the initial subspace matrix using random values.

17. The one or more non-transitory computer readable media of claim 13, wherein generating the modified subspace matrix comprises computing a gradient of an objective function with respect to the initial subspace matrix, wherein the objective function comprises a function for maximizing a probability of correctly classifying audio signals in the first class.

18. The computer-implemented method of claim 5, wherein obtaining the Gaussian mixture model comprises obtaining the mean vector and a covariance matrix, wherein the mean vector comprises mean values for individual Gaussian components of the Gaussian mixture model, and wherein the covariance matrix is different than the initial subspace matrix and the modified subspace matrix.

19. The one or more non-transitory computer readable media of claim 13, wherein obtaining the Gaussian mixture model comprises obtaining the mean vector and a covariance matrix, wherein the mean vector comprises mean values for individual Gaussian components of the Gaussian mixture model, and wherein the covariance matrix is different than the initial subspace matrix and the modified subspace matrix.

20. The one or more non-transitory computer readable media of claim 13, wherein the process further comprises:
   obtaining a set of audio signal data segments with corresponding class labels;
   generating a first set of test class labels using the set of audio signal data segments and the Gaussian mixture model with the mean vector;
   determining the first probability using the first set of test class labels and the corresponding class labels;
   generating a second set of test class labels using the set of audio signal data segments and the Gaussian mixture model with the second mean vector; and
   determining the second probability using the second set of test class labels and the corresponding class labels.

* * * * *

UNITED STATES PATENT AND TRADEMARK OFFICE
CERTIFICATE OF CORRECTION

PATENT NO.       : 9,892,726 B1
APPLICATION NO.  : 14/574239
DATED            : February 13, 2018
INVENTOR(S)      : Sri Venkata Surya Siva Rama Kr Garimella et al.

Page 1 of 1

It is certified that error appears in the above-identified patent and that said Letters Patent is hereby corrected as shown below:

In the Specification

In Column 3 at Lines 46-47, Change "deteimining" to --determining--.

In Column 7 at Line 12, Change "deteiinine" to --determine--.

In Column 10 at Line 17 (approx.), After "thereof" insert --.--.

In Column 12 at Line 38, Change "teiiiis" to --terms--.

In Column 12 at Lines 62-63, Change "perfoiins" to --performs--.

In the Claims

In Column 15 at Line 38, In Claim 6, before "an" delete "a".

Signed and Sealed this
Twenty-eighth Day of May, 2019

Andrei Iancu
*Director of the United States Patent and Trademark Office*